US008204121B2

(12) United States Patent

Feng et al.

(10) Patent No.: US 8,204,121 B2

(45) Date of Patent: Jun. 19, 2012

(54) METHOD AND APPARATUS FOR MP3 DECODING

(75) Inventors: Zhou Jin Feng, Beijing (CN); David Gao, Beijing (CN)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 2125 days.

(21) Appl. No.: 11/020,743

(22) Filed: Dec. 23, 2004

(65) Prior Publication Data

US 2006/0047521 A1 Mar. 2, 2006

(30) Foreign Application Priority Data

Sep. 1, 2004 (TW) ............................... 93126325 A

(51) Int. Cl.
*H04N 7/12* (2006.01)

(52) U.S. Cl. ......... 375/240.15; 375/240.01; 375/240.12; 704/200; 704/200.1; 704/203

(58) Field of Classification Search ............. 375/240.15, 375/240.12, 240.01; 704/203.1, 200, 200.1, 704/203
See application file for complete search history.

(56) References Cited

U.S. PATENT DOCUMENTS 6,552,619 B2 * 4/2003 Shastri ............................ 331/25
6,934,677 B2 * 8/2005 Chen et al. ................. 704/200.1
7,299,190 B2 * 11/2007 Thumpudi et al. ............ 704/500
7,315,822 B2 * 1/2008 Li ................................ 704/500
* cited by examiner

*Primary Examiner* — Sath V Perungavoor
*Assistant Examiner* — Geepy Pe
(74) *Attorney, Agent, or Firm* — Thomas|Kayden

(57) ABSTRACT

A memory optimization method for a MP3 decoder. In a pipeline structure for speeding matrix calculation in Mp3 decoding, an output sequence of IMDCT calculation is altered so that matrix calculation is activated before completing the IMDCT calculation. A decoding control method allows pipeline processing in MP3 decoding, with decoding procedures for subsequent granules activated while the current granule is still being processing in the matrix calculation.

8 Claims, 7 Drawing Sheets

METHOD AND APPARATUS FOR MP3 DECODING

BACKGROUND

The invention relates to MP3 decoding, and more specifically, to methods and apparatuses of memory optimization and pipeline processing used in MP3 decoding.

MP3, MPEG-1/AudioLayer-III, is a high compression digital audio format. An MP3 device decodes data stored in digital storage media. Audio data is usually compressed in accordance with human hearing capabilities, with features are usually referred to as volume, pitch, and masking effect. Volume is a measure of the strength of the sound. Hearing sensitivity for humans varies greatly with the frequency of the sound, for example, width more sensitivity to audio signals with frequency between 2000 and 4000 Hz (2 KHz~4 KHz), whereas signals with a much lower or much higher frequency require a higher volume (or larger signal amplitude) to be audible. Pitch is generally measured in frequency, with audible range approximately from 20 Hz to 20 KHz. Masking effect occurs when the sound of a particular frequency band obstructs that of another frequency band, and is generally divided into frequency masking and time masking.

An MP3 device decodes compressed data to form a compressed digital signal to its original audio signal. FIG. 1 is a block diagram illustrating an MP3 decoder. A synchronizing and error checking module 100 receives audio digital data, carried by a bitstream 101 comprising a plurality of frames. The synchronizing and error checking module 100 authenticates and decodes the bitstream 101, searches the starting and finishing address for each frame, and checks for errors. If an MP3 bitstream 101 contains self-defined ancillary data 103, the module 100 outputs the ancillary data 103 directly without decoding. Huffman decoding module 102, side information decoding module 104, and scale factor decoding module 106 decode corresponding information retrieved from the synchronizing and error checking module 100 respectively. These decoding modules 102, 104, and 106 are later described in detail. The decoded data is then passed to a re-quantization module 108. The function of the re-quantization module 108 includes reconstruction of the frequency lines generated by the encoder. The frequency line reorder module 110 determines if the sub-band comprises short windows. If so, the data is reassembled according to the output order of the encoder. A stereo processing module 112 receives the frequency lines from the frequency reassembly module 110, and the stereo processing module 112 recovers the left and right audio signals from the encoded audio signal. The audio signal is divided into left and right channels, and processed in parallel. The processing modules of the decoder include alias reconstruction modules 114*a*, 114*b*, IMDCT modules 116*a*, 116*b*, frequency inversion modules 118*a*, 118*b*, and multi-phase filters 120*a*, 120*b*. The alias reconstruction modules 114*a* and 114*b* reconstruct the audio signals by mixing to cancel the anti-alias effect induced in the encoder. The inverse modified discrete cosine transform (IMDCT) modules 116*a*, 116*b* convert the frequency lines into multi-phase filter sub-band samples. The frequency inversion modules 118*a*, 118*b* compensate for the frequency inversion by multiplying the samples of the odd sub-bands by −1. The multi-phase filters 120*a*, 120*b* calculate successive audio samples, and output the left channel 107 and right channel 105 respectively.

As shown in FIG. 2, a frame in the MP3 bitstream includes a header 200, a cyclic redundancy check (CRC) code 202, side information 204, a main data zone 206, and ancillary data 208. The header 200 of the frame has 32 bits of data, including 12 synchronization bits. The synchronizing and error checking module 100 of FIG. 1 determines the position of each frame by searching the 12 synchronization bits, and detects errors according to the 16-bit CRC code. The side information 204 provides information selection and scale factor reconstruction in Huffman decoding. MP3 employs bit reservoir technique, such that the side information 204 also includes information indicating the starting position of the main data. The length of the side information is either 136 bits for mono audio channel, or 256 bits for stereo channel. The main data zone 206 includes the coded scale factor and data after Huffman encoding. The length of main data in each frame is variable in accordance with the Huffman code. If there is an available bit reservoir in the main data zone 206 of a frame, the main data of subsequent frames is stored therein. Main data of a frame can also be segmented, and these portions can be individually stored in the main data zone 206 of many frames. The starting position of the main data can be determined by reading the bit index data from the side information 204. The main data zone 206 is divided into granules including only one channel in a mono audio mode, and granules including two channels in stereo modes. Each channel comprises a scale factor and Huffman code. The Huffman code in a channel corresponds to 576 frequency lines. The end of the frame is ancillary data 208, with the format of the ancillary data 208 is defined by the user. The MP3 decoder outputs the ancillary data 208 without decoding or performing any data processing.

After Huffman decoding of the main data of the MP3 bitstream, frequency lines representing strength of the compressed voice in each frequency are retrieved. A set of 576 frequency lines can be generally divided into a first zone (usually referred to as big-values) 40, a second zone (usually referred to as count1) 42, and a third zone (usually referred to as rzero) 44. The boundaries of the three zones are designated by the side information. Human is more sensitive to frequencies range from 2 KHz to 4 KHz, which is referred to as low frequency in the hearing range, thus the corresponding zone (big-values) 40 usually contains large values. High frequencies are not easily audible, thus there are successive zero values in the high frequency zone (rzero) 44.

During Huffman decoding, the boundary of rzero zone 44 is determined and the decoder inserts the appropriate number (r) of zeros therein. Data processing after Huffman decoding, such as re-quantization, stereo processing, alias reconstruction, and IMDCT, however, requires additional r read operations and r write operations, reducing decoding efficiency.

The inverse modified discrete cosine transform (IMDCT) modules 116*a* and 116*b*, and multi-phase filters 120*a* and 120*b* occupy most of the computational time in the MP3 decoder. According to the block diagram of FIG. 1, the MP3 decoder only starts to process subsequent granules after generating left and right channels from the current granule. The processing speed required for the MP3 device is high in order to achieve the desirable audio output. Methods for increasing MP3 decoding rate are therefore widely sought.

SUMMARY

A memory optimization method for a frequency line storage unit is provided, wherein 576 frequency lines stored in a storage unit are read by a decoder sequentially, and upon detection of a frequency line address exceeding a predetermined zero boundary address, the read operation is terminated. Reading, writing, and calculation of frequency lines after Huffman decoding in the MP3 decoder are thus significantly reduced. Memory optimization method reducing memory access is implemented in a re-quantization module, stereo processing module, alias reconstruction module, or an IMDCT module in the MP3 decoder. The computation load of these modules is reduced when implementing the memory optimization method.

A device reducing read and write operations in a MP3 decoder is also provided. The device comprises a storage unit storing 576 frequency lines, and a control unit. The control unit detects whether the address of each frequency line exceeds a zero boundary address, and immediately terminates read operations if the address exceeds the zero boundary address.

Also provided is an MP3 decoding method employing a pipeline structure. The MP3 decoding method comprises transforming a set of frequency lines with K sub-bands into K sub-band samples $S_i^k$ (k=0~K), wherein the K sub-band samples $S_i^k$ with the same "i" are calculated at one time and output immediately for matrix calculation. K corresponding audio samples are thus derived from the K sub-band samples $S_i^k$ by matrix calculation without requiring remaining sub-band samples to be calculated, such that the sub-band samples can be processed in parallel when employing pipeline processing in MP3 decoders, with a set of frequency lines including 32 sub-bands (K=32).

An MP3 decoder implementing the pipeline structure is further provided, comprising an inverse modified discrete cosine transform (IMDCT) module and a multi-phase filter. The IMDCT module transforms the frequency lines of K sub-bands into sub-band samples $S_i^k$ (k=0~K). The multi-phase filter receives and calculates the sub-band samples $S_i^k$ and reconstructs consecutive audio samples accordingly. The order of calculation and output of sub-band samples $S_i^k$ matches the order of calculation in the multi-phase filter, allowing the multi-phase filter and the IMDCT module to process the frequency lines in parallel. K sub-band samples Sik with the same "i" are calculated at one time, with the calculated sub-band samples $S_i^k$ output to the multi-phase filter immediately. The multi-phase filter then computes K corresponding audio samples according to the sub-band samples $S_i^k$.

The MP3 decoder further comprises a frequency inversion module, receiving output from the IMDCT module, multiplying every odd sub-band sample in each odd sub-band by −1, for output to the multi-phase filter.

An MP3 decoding control method is also provided for at least one bitstream, comprising granules requiring decoding and matrix calculation to recover consecutive audio samples for an audio channel. The control method comprises matrix calculation for a granule according to a pipeline structure, wherein a granule can be decoded before the matrix calculation for the previous granule is completed. Matrix calculation of granules can thus overlap. The decoding process may include Huffman decoding, re-quantization, and stereo processing.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
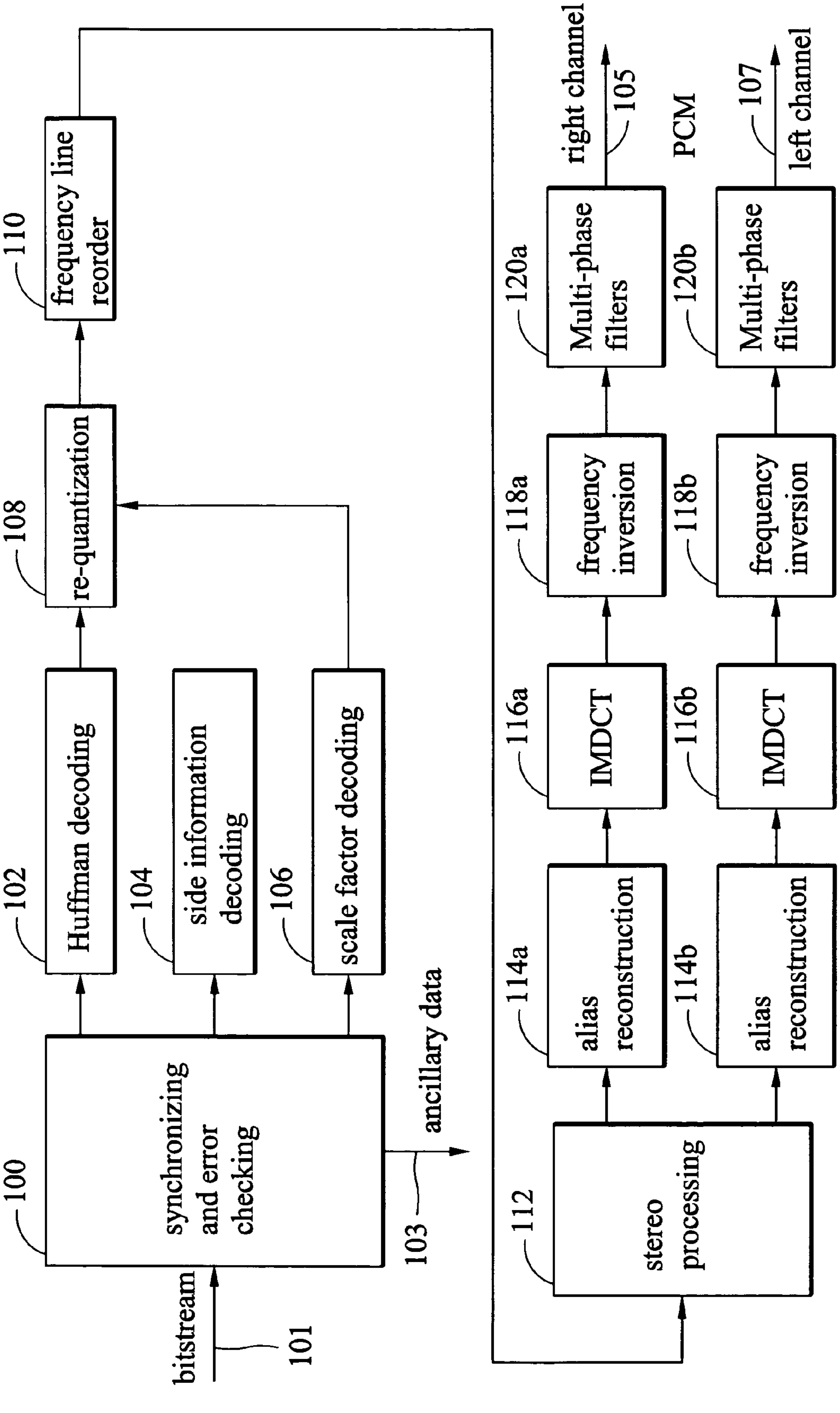
FIG. 1 shows the functional blocks in a conventional MP3 decoder.
Figure 2:
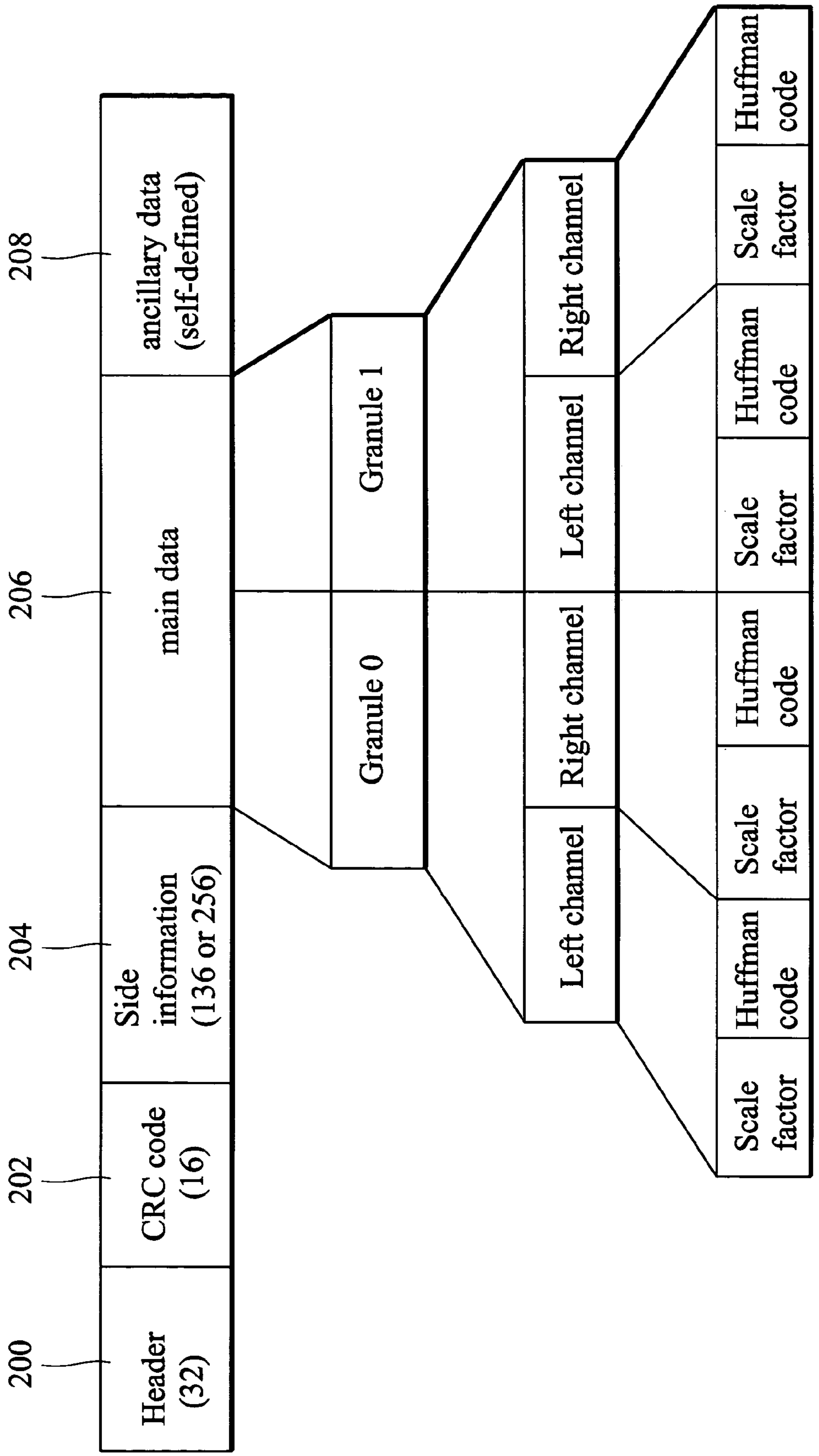
FIG. 2 shows data structure of an MP3 frame.
Figure 3:
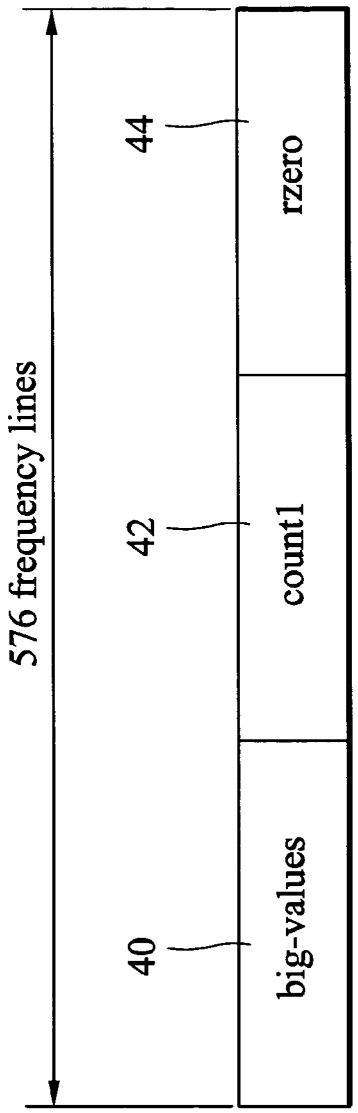
FIG. 3 shows structure of MP3 frequency lines.
Figure 4:
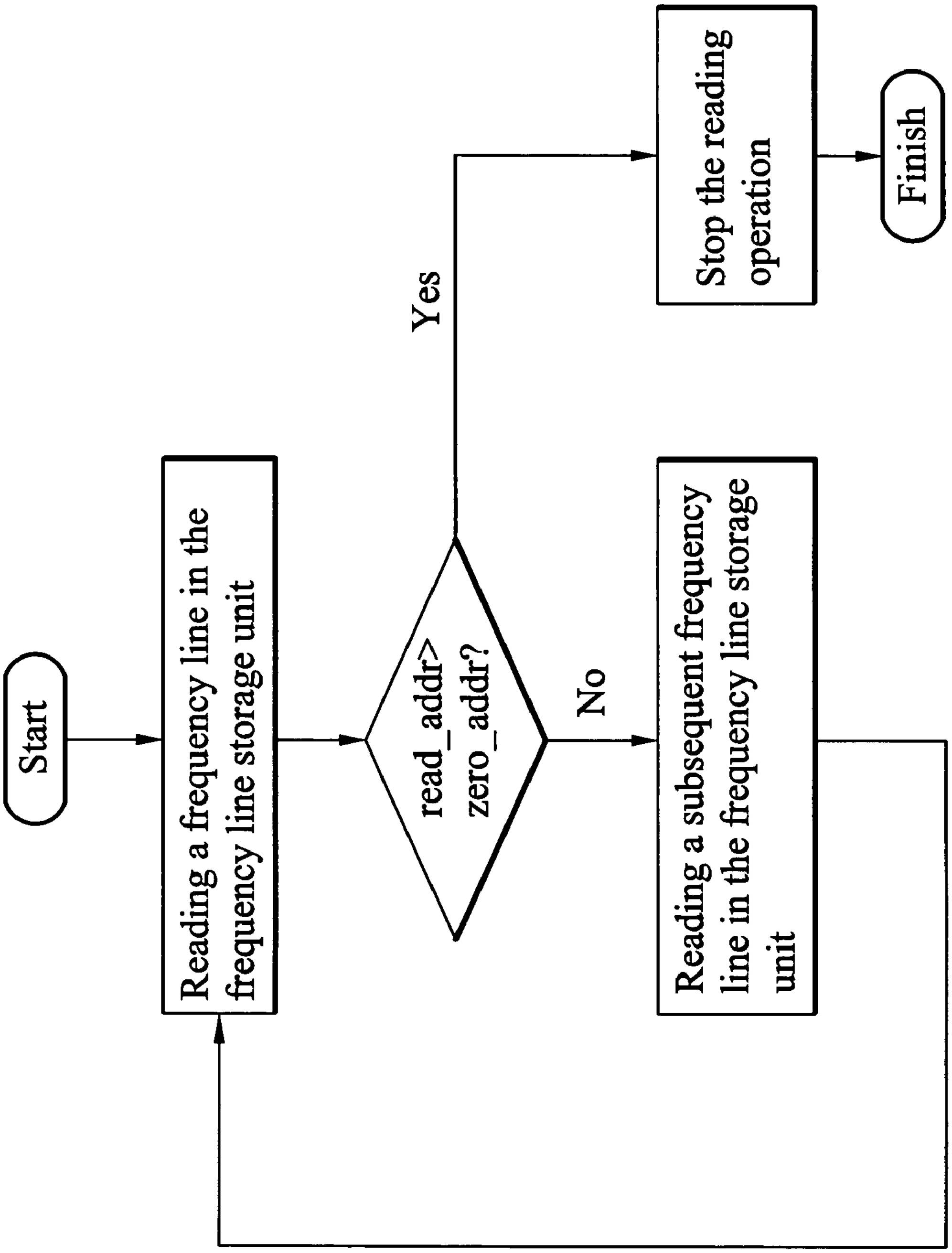
FIG. 4 is a flowchart of a method for accessing frequency lines according to an embodiment of the invention.

In embodiments of the invention, a memory optimization method is achieved according to a specific feature of the 576 frequency lines shown in FIG. 4. The high frequency rzero zone 44 containing consecutive zeros will be treated differently than the other two zones 40 and 42. Since the values of the frequency lines in rzero zone 44 are all zero, unnecessary read and write operations are omitted by detecting the boundary between count1 42 and rzero 44 zones (zero boundary).

Conventional Huffman decoding comprises inserting a plurality of zeros for frequency lines in rzero zone 44 after decoding the frequency lines in big-values 40 and count1 42 zones. A method according to embodiments of the invention omits unnecessary read or write operations by comparing a current reading/writing address corresponding to a frequency line (read_addr) with the address of the zero boundary (zero_addr).

Read or write operations can be terminated when the read or write frequency line address exceeds the zero_addr. As a result, access to the frequency line storage unit is reduced. If rzero zone 44 comprises r frequency lines, the system requires r write operations if the system processes rzero zone 44 in the same way as the other two zones 40 and 42, and the system requires r read operations for rzero zone 44 when acquiring frequency line values from the frequency line storage unit. The initial boundary of rzero zone 44 (zero_addr) is recorded so that repeated insertion of zeros is omitted, conserving r write operations when storing the frequency lines in the memory, and saves r reading operations when reading the frequency lines from the memory.

Huffman decoding or alias reconstruction module in the MP3 decoder can be programmed to update the value of zero_addr during decoding. The flowchart shown in FIG. 9 illustrates reading values from a frequency line storage unit performed in a module of the MP3 decoder according to an embodiment of the invention. Examples of the module in FIG. 9 include re-quantization, stereo processing, alias reconstruction, and IMDCT modules. The module determines if the value of a subsequent frequency line needs to be read by comparing the current frequency line reading address (read_addr) to the initial boundary of rzero zone (zero_addr). The module stops reading the value of the subsequent frequency line when read_addr exceeds zero_addr. Computation of the module is therefore reduced since retrieved frequency lines are fewer than 576. The values in rzero zone are always zero after computation, making it feasible to ignore the rzero zone during computation.

The memory optimization method according to embodiments of the invention can be implemented in modules of the MP3 decoder utilizing a frequency line storage unit and a control unit. The frequency line storage unit stores 576 frequency lines, and the control unit terminates the read/write operation upon detection of the current read/write frequency line address exceeds the boundary address of rzero zone.

Typically, rzero zone contains around 202 frequency lines after Huffman decoding, about a third of the total frequency lines. The memory optimization method and the corresponding MP3 decoder according to embodiments of the invention thus conserve approximately ⅓ the read and write operations, and can be implemented by software programming.

Figure 5:
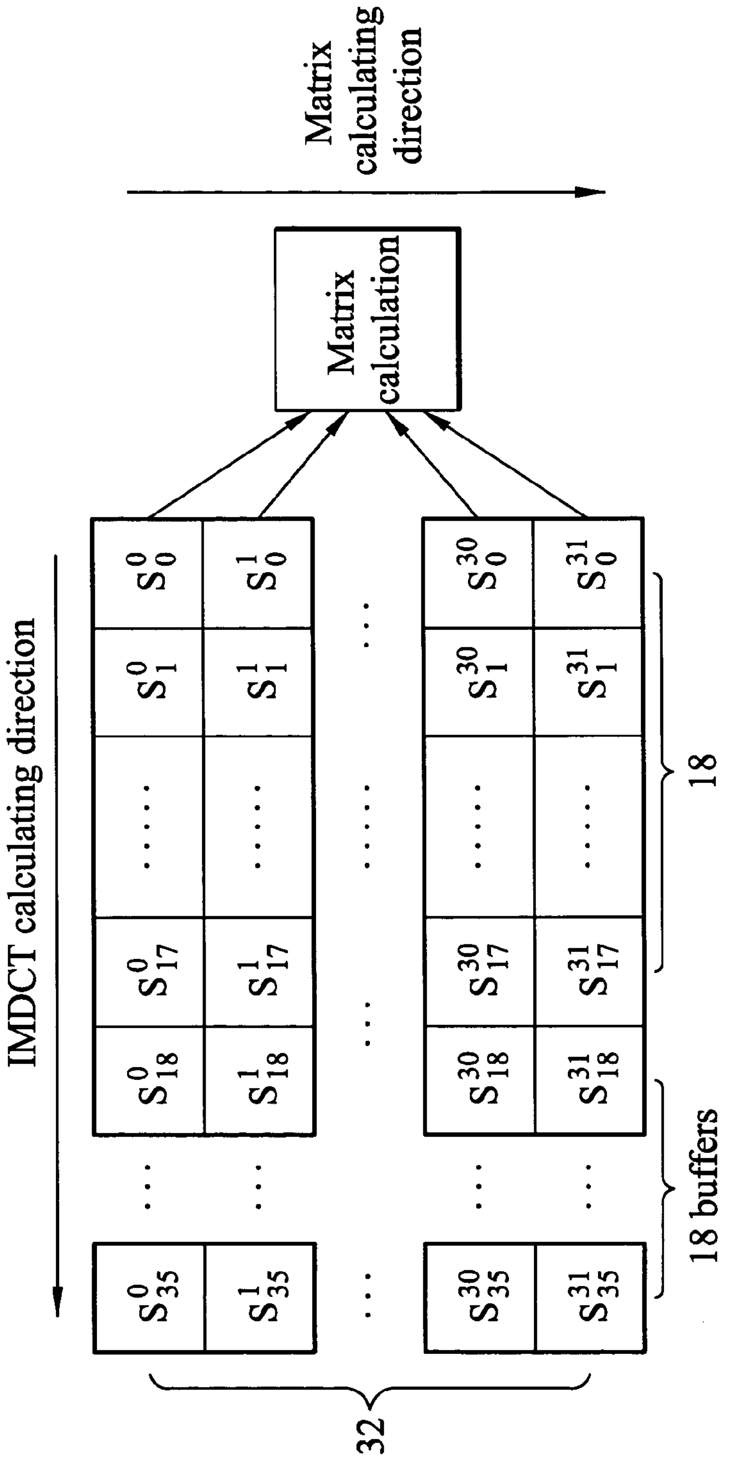
FIG. 5 illustrates the relationship between matrix computation and IMDCT calculation according to an embodiment of the invention.

FIG. 5 illustrates the relationship between sub-band sample calculation in an IMDCT module and matrix computation in a multi-phase filter. The symbol $S_i^k$ of a sub-band sample denotes the sample is the $i^{th}$ sub-band sample obtained from IMDCT calculation corresponding to the $k^{th}$ sub-band. The value of K here ranges from 0 to 31, the value of i ranges from 0 to 35, and the samples with i=18~34 will be buffered for calculation of a subsequent granule. Each left or right channel contains 576 frequency lines in a granule. The sequence of obtaining samples $S_i^k$ for matrix calculation follows the vertical direction (from top to bottom) as shown in FIG. 5, for example, $S_0^0$, $S_0^1$, $S_0^2$, . . . , $S_0^{31}$, $S_1^0$, $S_1^1$, $S_1^2$, . . . , and $S_1^{31}$. The sequence of IMDCT computation, however, follows the horizontal direction as shown in FIG. 5, for example, $S_0^0$, $S_1^0$, $S_2^0$, . . . , $S_{35}^0$, $S_0^1$, $S_1^1$, $S_2^1$, . . . , and $S_{35}^1$. Accordingly, the matrix calculation for a granule cannot proceed until all IMDCT computations for the granule are completed, making the serial processing structure slow and inefficient. IMDCT calculation typically requires 244 multiplication operations for a single sub-band, hence requiring 244*32=7808 operations for multiplication requiring to process 32 sub-band IMDCT computation (the multiplication for IMDCT frame function is ignored here). The matrix computation can begin calculation of the sub-band samples of a granule only when the IMDCT module performs 7808 multiplying operations. 576 samples require a total of 32*16*18=9216 multiplication operations for matrix computation. Therefore, the time required for processing a granule from IMDCT to matrix computation equals the time spent performing 7808+9216=17024 multiplying operations.

An IMDCT module in an MP3 decoder performs data calculation following the sequence of vertical direction shown in FIG. 5 to match the matrix computation direction. The matrix computation can be activated as soon as samples $S_0^k$ and $S_{17}^k$ (k=0, 1, 2, . . . , 31) are obtained from the IMDCT calculation. For IMDCT calculation, neighboring sub-band samples such as $S_0^k$ and $S_{17}^k$, $S_1^k$ and $S_{16}^k$, $S_2^k$ and $S_{15}^k$ can be calculated simultaneously, such that maximum waiting time before activating the matrix calculation is approximately equivalent to the time for 32*18+32=608 multiplication operations (assuming one multiplying operation for window function). The samples $S_0^k$ can be entered to perform matrix computation while the samples $S_1^k$ and $S_{16}^k$ are generated from the IMDCT calculation. Similarly, the samples $S_1^k$ can be entered to perform matrix computation while the samples $S_2^k$ and $S_{15}^k$ are generated from the IMDCT calculation. As a result, pipeline data processing is established between IMDCT calculation and matrix calculation as the time spent on IMDCT calculation is "hidden" in the time spent on matrix calculation for a previous sub-band.

The pipeline processing structure requires only 32*16*18+608=9824 multiplication operations, which includes at most 18 matrix computations and 1 IMDCT computation for a row. The pipeline processing structure can thus save at least 40% of the processing time compared to serial processing structures employed in the current MP3 decoder.

By examining the computational load, the time spent on 18 matrix calculations is usually much longer than that performing IMDCT calculation for 9 rows. After IMDCT calculation for a granule, decoding of a subsequent granule can be performed at the same time as processing of the remaining subbands of the granule for matrix computation.

Figure 6:
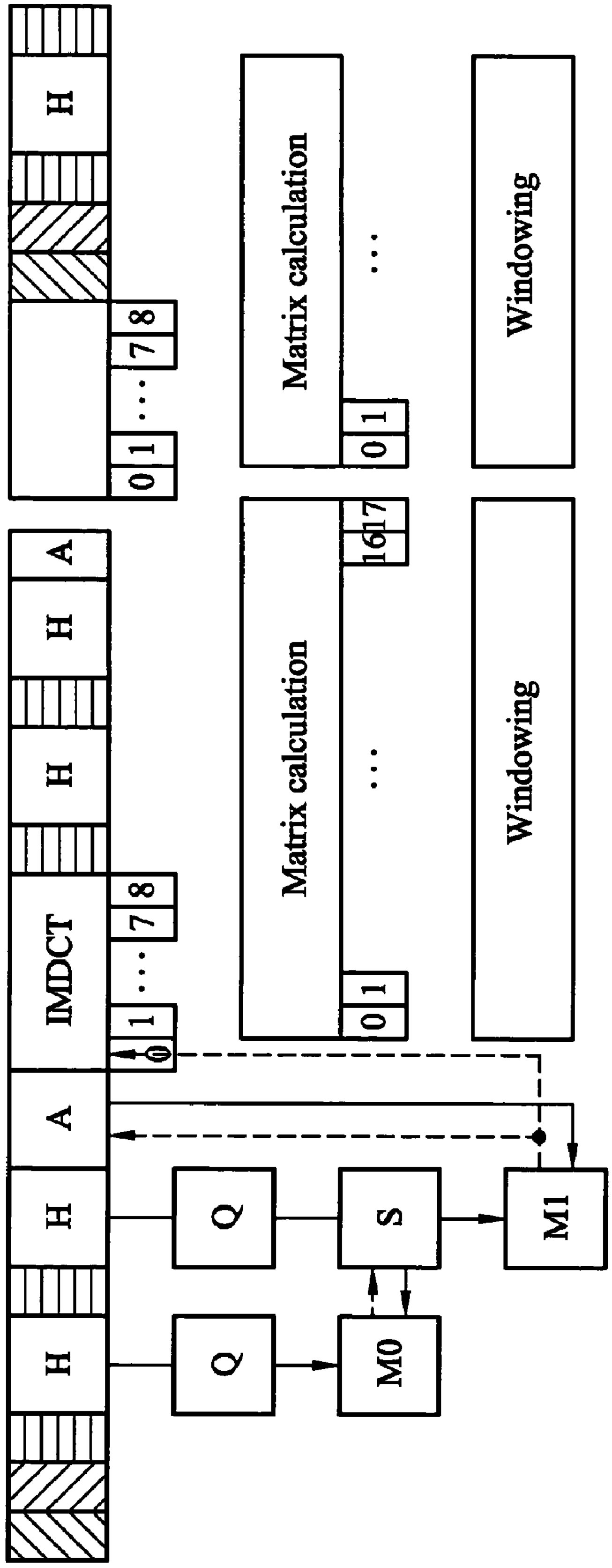
FIG. 6 illustrates a pipeline structure for processing granules according to an embodiment of the invention.

There are two granules in a frame, granule 0 and granule 1, both of which can be processed in pipeline as shown in FIG. 6. FIG. 6 depicts only the right channel since the left and right channels are processed in parallel. Storage devices M0 and M1 store the frequency lines after Huffman decoding (H), re-quantization (Q), and stereo processing (S) for left and right channel individually. Alias reconstruction is represented by symbol "A" in the Figure.

As shown in FIG. 6, the storage device M0 and M1 will not be used to process granule 0 after undergoing IMDCT calculation. Operations using M0 and M1, such as decoding of the scale factor, Huffman decoding, re-quantization, and stereo processing for granule 1 can thus be activated while matrix calculation and windowing for granule 0 has not yet completed (re-quantization and stereo processing for granule 1 is not shown in FIG. 6). The processing time for decoding the scale factor, Huffman decoding, re-quantization, stereo processing, and alias reconstruction for granule 1 is within the time spent on matrix calculation and windowing for granule 0. Similarly, the processing time spent on decoding header, side information, and scale factor, Huffman decoding, re-quantization, stereo processing, and alias reconstruction for granule 0 of the subsequent frame is within the time spent on matrix calculation and windowing for granule 1 of the current frame. The processing time spent on decoding header, side information, and scale factor, Huffman decoding, re-quantization, stereo processing, and alias reconstruction for frames other than the first frame can be "hidden" in the processing time for matrix calculation and windowing for the previous granule.

As shown in FIG. 6, the processing time for decoding a granule includes the time spent on 1 IMDCT calculation and 18 windowing operations, and the processing time for the remaining steps overlaps by the processing time of a previous granule. IMDCT calculation requires at most 608 multiplication operations, and each windowing operation requires 512 multiplication operations, hence the total time for decoding a granule is equivalent to the time spent on 608+512*18=9824 multiplication operations. A frame comprises two granules, so decoding a frame requires 9824*2=19648 multiplication operations. When the sampling frequency is 48 KHz, instantaneous decoding requires decoding at least 42 frames in one second, which means the decoder requires 19648*42=825216 multiplication operations to be accomplished in one second.

Operations such as decoding the scale factor, Huffman decoding, re-quantization, and stereo processing for granule 0 of the subsequent frame can be immediately activated when the IMDCT calculation for granule 1 is completed.

Figure 7:
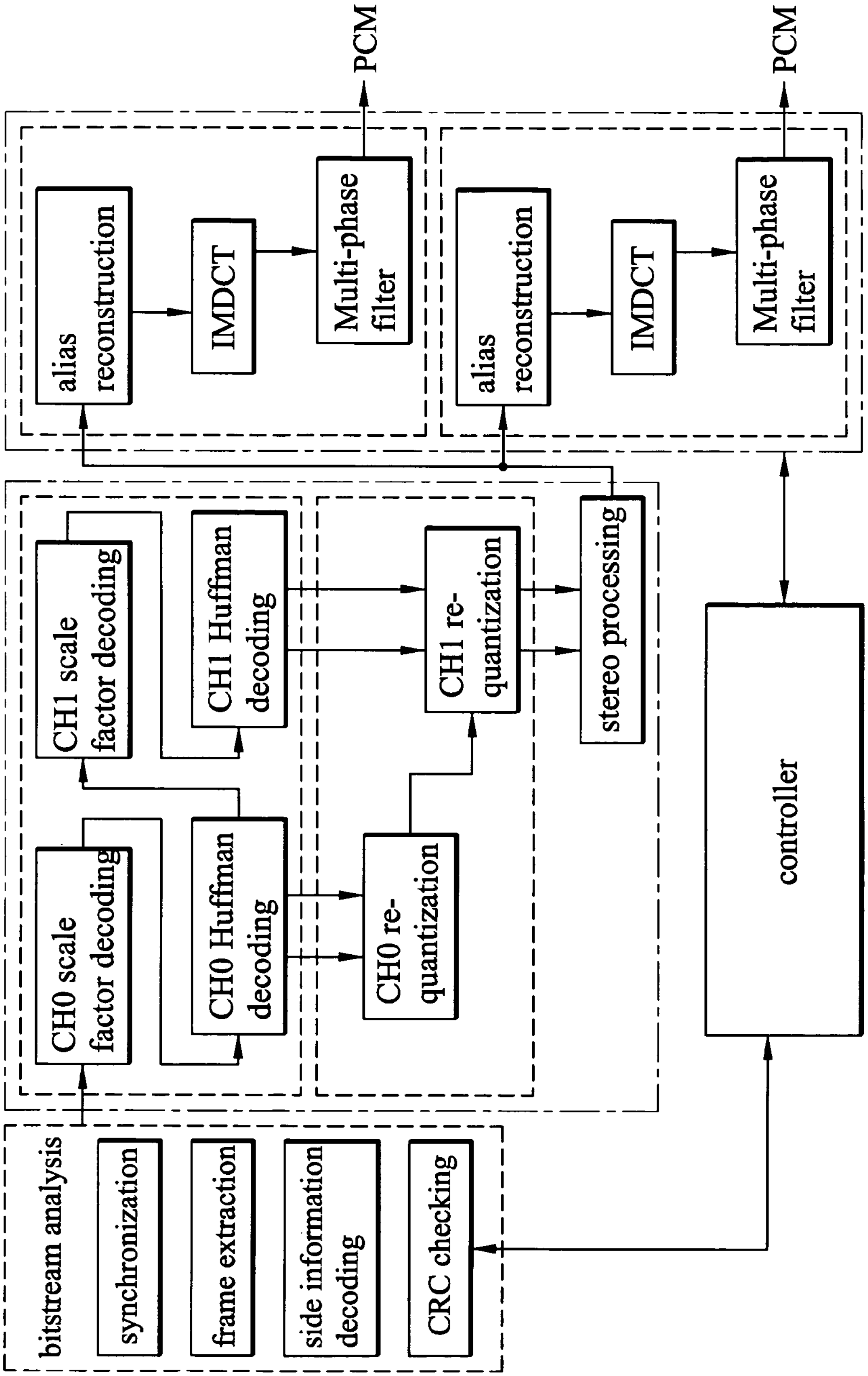
FIG. 7 illustrates the functional structure of a MP3 decoder of embodiments of the invention.

FIG. 7 illustrates the functional structure of a MP3 decoder of embodiments of the invention, where controller 300 controls the operations of functional blocks. In bitstream analysis, synchronization is performed to execute frame extraction. Side information will be decoded and cyclic redundancy check (CRC) is also checked to see if a relevant frame is valid. Scale factor decoding for channel 0 is performed and then scale factor decoding for channel 1, the other channel, is performed. Huffman decoding and re-quantization for channel 0 are separated from those for channel 1, consistent with the disclosure in FIG. 6. In other words, signals of channels 0 and 1 are parallel processed, and mixed in stereo processing module to recover the left and right audio signals. The left and right channel signals are processed parallel and fed to two separate modules respectively, each performing alias reconstruction, IMDCT and multi-phase filtering, as shown in FIG. 7. As taught in FIG. 5, a pipeline data processing can be established between IMDCT and matrix calculation. Furthermore, Huffman decoding, re-quantization and stereo process can be performed as a pipeline data processing. While a matrix calculation for a granule is performed, windowing of that granule can be performed as a pipeline data processing, and Huffman decoding and stereo processing of the subsequent granule can be parallel performed to save process time, as shown in FIG. 6. Due to the differences between the operation numbers of modules, IMDCT module and multi-phase filter can utilize a main clock while frame extraction, side information decoding, scale factor decoding, Huffman decoding, re-quantization, and stereo processing can utilize a divisional clock having a frequency half of that of the main clock. Furthermore, when a granule is recognized as mono, having signals of only one channel, feeding of the main and divisional clocks to modules relevant to an unused channel is blocked so that relevant modules are disabled, thereby skipping useless module operation and decreasing power consumption.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An MP3 decoding control method for processing at least one bitstream, wherein the bitstream comprises granules, and each granule requires decoding and matrix calculation to recover audio samples of an audio channel, wherein the control method comprises:

performing matrix computation for a granule;

performing decoding for a subsequent granule; and performing IMDCT for the granule, wherein IMDCT and matrix computation are performed as a pipeline data processing;

wherein the time spent performing matrix computation for the granule is within the time spent performing decoding for the subsequent granule; and wherein the pipeline data processing is established between IMDCT and matrix calculation as the time spent on IMDCT is hidden in the time spent on matrix calculation for a previous sub-band.

2. The method according to claim 1, further comprising performing IMDCT computation for the granule, wherein the time spent performing IMDCT computation for the granule partially overlaps time spent performing decoding for the subsequent granule.

3. The method according to claim 1, further comprising:

performing Huffman decoding for the subsequent granule; and performing re-quantization for the subsequent granule.

4. The method according to claim 3, further comprising performing stereo processing for the subsequent granule.

5. The method according to claim 1, wherein each granule has signals of channels, and performing decoding for the subsequent granule comprises parallel decoding signals of channels.

6. The method according to claim 1, further comprising:

for the granule, performing Huffman decoding, re-quantization and stereo processing as a pipeline data process.

7. The method according to claim 1, comprising:

providing a main clock and a divisional clock having a frequency half of that of the main clock;

performing the matrix computation according to the main clock; and performing the decoding according to the divisional clock.

8. The method according to claim 1, wherein each granule is capable of having signals corresponding to channels, the method comprising:

providing modules corresponding to channels, respectively;

providing a clock for operations of the modules; and determining whether the granule has no signal in an unused channel; and stopping feeding the clock to the module corresponding to the unused channel when the granule has no signal in the unused channel.

* * * * *